United States Patent [19]
Ollivier et al.

[11] Patent Number: 6,100,210
[45] Date of Patent: Aug. 8, 2000

[54] METHOD FOR REGENERATING A CATALYST WITH A SULPHURUS ACTIVE PHASE AND CONTAMINATED BY A MERCURY COMPOUND

[75] Inventors: James Ollivier, Cendras; Pierre Le Cloirec, La Chapelle sur Erdre; Jean-Paul Bournonville, Monteils; Bernard Nocher, La Celle Saint Cloud, all of France

[73] Assignee: Procatalyse, Rueil Malmaison, France

[21] Appl. No.: 09/194,205

[22] PCT Filed: May 13, 1997

[86] PCT No.: PCT/FR97/00847

§ 371 Date: Mar. 26, 1999

§ 102(e) Date: Mar. 26, 1999

[87] PCT Pub. No.: WO97/44131

PCT Pub. Date: Nov. 27, 1997

[30] Foreign Application Priority Data

May 20, 1996 [FR] France .................................. 96 06202

[51] Int. Cl.[7] .............................. B01J 20/34; B01J 38/64; B01J 38/66
[52] U.S. Cl. ................................................ 502/26; 502/25
[58] Field of Search ......................................... 502/25, 26

[56] References Cited

U.S. PATENT DOCUMENTS

| | | |
|---|---|---|
| 3,870,624 | 3/1975 | Tice et al. . |
| 4,094,777 | 6/1978 | Sugier et al. . |
| 4,474,896 | 10/1984 | Chao . |
| 4,740,491 | 4/1988 | Wise et al. . |
| 4,880,527 | 11/1989 | Audeh . |
| 5,409,522 | 4/1995 | Durham et al. . |
| 5,928,617 | 7/1999 | Grande . |

FOREIGN PATENT DOCUMENTS

| | | |
|---|---|---|
| 0 153 233 | of 0000 | European Pat. Off. . |
| 0 198 730 | of 0000 | European Pat. Off. . |
| 1 109 939 | of 0000 | United Kingdom . |

*Primary Examiner*—Tom Dunn
*Assistant Examiner*—Michael J. Rhee
*Attorney, Agent, or Firm*—Burns, Doane, Swecker & Mathis, L.L.P.

[57] ABSTRACT

The invention features a method for treating a supported catalyst with a sulphur compound based active phase and a mercury compound contaminated mineral support. This method consists in implementing the following steps: the said catalyst is contacted with a basic aqueous solution of at least one sulphide selected among alkaline metal sulphides, alkaline-earth metal sulphides or ammonium sulphide; then the catalyst is separated from the basic aqueous solution. At the end of this process, the treated catalyst shows the same characteristics as before its contamination by mercury.

16 Claims, No Drawings

METHOD FOR REGENERATING A CATALYST WITH A SULPHURUS ACTIVE PHASE AND CONTAMINATED BY A MERCURY COMPOUND

The present invention relates to a process for treating spent catalysts contaminated by mercury so as to regenerate them and reuse them.

At the present time, the treatment of contaminated, spent products is becoming an activity of increasing importance. Environmental constraints are requiring all types of liquids, solids or gases to be purified for the purpose of lowering their content of pollutants and of avoiding the latter being discharged into the environment.

Many catalysts have been developed for the purpose of eliminating these impurities by absorption, adsorption or chemical reactions. However, once the contaminated products have been purified, the impurities have high concentrations in these catalysts, which must be stored or destroyed.

Currently, the trend is to try to treat these spent catalysts so as to remove the impurities therefrom. The aim of this treatment is, on the one hand, to recover impurities for the purpose of their reutilization or conversion into an easily storable form and, on the other hand, to regenerate the spent catalysts so as to be able to reuse them. This second aspect furthermore allows savings to be made since a new charge of fresh catalyst does not have to be purchased.

Among impurities particularly harmful to the environment, mercury, in any of its forms, is of great importance. In particular, it is present in natural gas or petroleum cuts. One way of removing the mercury from these gases is to bring them into contact with a catalyst based on a sulphur compound, for example a supported catalyst having a mineral support and an active phase based on a sulphur compound, for example copper sulphide.

Mercury present in the gases reacts on contact with these catalysts to form a mercury compound, especially mercury sulphide, which remains adsorbed or absorbed on the catalyst.

Currently, spent catalysts comprising these mercury compounds are destroyed or stored; and a new charge of fresh catalyst must be used in order to continue treating the gases.

One object of the present invention is to provide a process for treating spent catalysts of this type which make it possible not only to remove the mercury therefrom but also to regenerate the initial active phase of the said catalyst so as to be able to use it again in the same application without having to redeposit a new active phase.

To this end, the invention relates to a process for regenerating a supported catalyst having an active phase based on a sulphur compound and a mineral support, contaminated by a mercury compound, in which the following steps are carried out:

the said catalyst is brought into contact with a basic aqueous solution of at least one sulphide chosen from alkali metal sulphides, alkaline-earth metal sulphides or ammonium sulphide, then the catalyst is separated from the basic aqueous solution.

Further advantages of the invention will appear more clearly on reading the description and the examples.

The invention therefore relates to a process for regenerating a supported catalyst having an active phase based on a sulphur compound and a mineral support, contaminated by a mercury compound in which the following steps are carried out:

the said catalyst is brought into contact with a basic aqueous solution of at least one sulphide chosen from alkali metal sulphides, alkaline-earth metal sulphides or ammonium sulphide, then the catalyst is separated from the basic aqueous solution.

According to the process of the invention, the spent catalyst from which it is necessary to remove the mercury compounds is brought into contact with a basic aqueous solution of one or more sulphides, as defined above.

Preferably, the basic aqueous solution is a solution of sodium sulphide or potassium sulphide.

According to a preferred way of carrying out the process of the invention, this basic aqueous solution is obtained by mixing an aqueous solution of one of these sulphides and sodium hydroxide.

In this case, the concentration of the sodium hydroxide is preferably at least 0.1M in the mixture, especially of at least 0.5M.

In general, it is recommended to use a basic aqueous solution whose pH is at least 10, preferably at least 12.

In order to optimize the quantities of products to be employed, the catalyst is preferably brought into contact with the basic aqueous solution in quantities such that the molar ratio of the sulphur provided by the basic aqueous solution to the mercury present in the catalyst (S/Hg) is at least 5, preferably at least 10.

Likewise, it is recommended to bring the catalyst into contact with the basic aqueous solution in quantities such that the ratio of the volume of the basic aqueous solution to the mass of the catalyst (L/S) is at least 2 l/kg, preferably at least 5.

The contact time between the spent catalyst and the basic aqueous solution may vary. In general, it is between 30 minutes and 8 hours. A contact time of approximately 2 hours is usually sufficient.

According to a preferred method, the treatment is carried out under the following conditions:

the sulphide used is sodium sulphide, the basic aqueous solution of sodium sulphide has an $Na_2S$ concentration of 0.5M, the basic aqueous solution of sodium sulphide has an NaOH concentration of 0.5M, and the L/S ratio is 5 l/kg.

The solid may be separated from the treatment solution by various techniques, such as filtration, draining, settling, flocculation and any other technique known to those skilled in the art.

Normally, after the catalyst has been separated from the basic aqueous solution, the catalyst may be washed using an aqueous washing solution.

This aqueous washing solution may be a fresh basic aqueous solution of a sulphide (or sulphides), as defined above, or simply water.

In general, after the catalyst has been separated from the basic aqueous solution and optionally after the catalyst has been washed, the catalyst may be dried.

This drying operation may be carried out by an oven treatment, the treatment being with a purge of a gas which is inert in terms of temperature, at a temperature of between 50 and 100° C.

After the catalyst has been separated from the basic aqueous treatment solution, it may be advantageous to reutilize the said basic aqueous solution by treating it in the presence of an acid compound. By introducing an acid compound into the basic aqueous solution coming from the process according to the invention, the mercury compound being in a soluble form therein, is precipitated so that it can be easily recovered by a simple filtration operation.

Next, the solution separated from the precipitated mercury compound is treated in order to recover $H_2S$, optionally for the purpose of recycling it. Thus, the sulphides contained in this solution are decomposed, for example by adding an acid compound, in order to give $H_2S$ which is removed by volatilization (heating, sparging with gases such as air, $N_2$, . . . ) and then recovered by absorption in a basic solutions, for example based on sodium hydroxide. This basic solution coming from the $H_2S$ absorption may be reutilized for a new cycle for treating a charge of spent catalyst.

The acid compounds allowing the mercury to be precipitated and the sulphides to be decomposed may be chosen from hydrochloric acid or sulphuric acid. It is preferable to add an acid compound to the basic aqueous solution so that the pH of the mixture is at most 7, preferably at most 2.

The process according to the invention is particularly useful for treating a supported catalyst having an active phase based on copper sulphide. The quantity of this compound in the catalyst to be treated may vary—it may be as much as 6% by weight with respect to the mass of the catalyst.

The supported catalyst may have a mineral support based on alumina, silica, silica-alumina or carbon.

Removal of the mercury is followed by analysis by means of various known analytical techniques for assaying mercury, especially by plasma emission spectrometry.

The advantage of the process according to the invention is that not only is mercury removed from the catalyst but also that the active phase of the catalyst is regenerated and the support has the same characteristics as during the first time it was used.

The mercury sulphide may be reutilized.

The following examples illustrate the invention without, however, limiting the scope thereof.

EXAMPLE

The starting point is a catalyst having the following characteristics:

Support:
 alumina
 SSA=125 $m^2/g$
 TPV=0.75 $cm^3/g$

Active phase:
 CuS
 amount: 15.3% by weight with respect to the catalyst.

This catalyst is used in a unit for removing mercury from a natural gas. At the end of the gas treatment, the catalyst comprises 5.2% by weight of mercuric sulphide.

The catalyst is extracted from the unit in order to be treated according to the process of the invention.

1 kg of spent catalyst is introduced into a reactor. 5 liters of an aqueous solution of sodium sulphide and sodium hydroxide, having the following characteristics:

pH=13–14

NaOH concentration=0.5M $Na_2S$ concentration=0.5M

S/Hg molar ratio=11.2 are prepared.

The treatment solution is made to flow over the catalyst continuously for 2 hours.

The sodium sulphide solution is then drained off from the reactor. The catalyst is washed with another sodium sulphide solution having the same characteristics as the previous solution, and then washed with water.

Finally, it is dried.

The residual mercuric sulphide content is less than 0.1% by weight with respect to the catalyst. Next, hydrochloric acid is added to the treatment solution, which contains mercuric sulphide, so as to reach a pH of less than or equal to 2. Under these conditions, mercuric sulphide precipitates. Its residual concentration in the solution after the hydrochloric acid has been added is less than or equal to 0.02 mg/l.

What is claimed is:

1. Process for regenerating a supported catalyst having an active phase based on a sulphur compound and a mineral support, contaminated by a mercury compound, comprising the following steps:

bringing said catalyst into contact with a basic aqueous solution of at least one sulphide comprising alkali metal sulphides, alkaline-earth metal sulphides or ammonium sulphide;

and separating the catalyst from the basic aqueous solution.

2. Process according to claim 1, wherein the basic aqueous solution is a solution of sodium sulphide or potassium sulphide.

3. Process according to claim 1, wherein the basic aqueous solution is obtained by mixing an aqueous solution of at least one sulphide, comprising alkali metal sulphides, alkaline-earth metal sulphides or ammonium sulphide, with sodium hydroxide.

4. Process according to claim 3, wherein the concentration of the sodium hydroxide is at least 0.1M.

5. Process according to claim 1, wherein the pH of the basic aqueous solution is at least 10.

6. Process according to claim 1, wherein the catalyst is brought into contact with the basic aqueous solution in quantities such that the molar ratio of the sulphur provided by the basic aqueous solution to the mercury present in the catalyst (S/Hg) is at least 5.

7. Process according to claim 1, wherein the catalyst is brought into contact with the basic aqueous solution in quantities such that the ratio of the volume of the basic aqueous solution to the mass of the catalyst (L/S, in l/kg) is at least 2.

8. Process according to claim 1, wherein, after the catalyst has been separated from the basic aqueous solution, the catalyst is washed using an aqueous washing solution.

9. Process according to claim 8, wherein, after the catalyst has been separated from the basic aqueous solution and after the catalyst has been washed, the catalyst is dried.

10. Process according to claim 1, wherein, after the catalyst has been separated from the basic aqueous solution, said basic aqueous solution is reutilized by adding an acid compound.

11. Process according to claim 10, wherein an acid compound is added to the basic aqueous solution so that the pH of the mixture is at most 7.

12. Process according to claim 1, wherein the supported catalyst has an active phase based on copper sulphide.

13. Process according to claim 1, wherein the supported catalyst has a mineral support based on alumina, silica, silica-alumina or carbon.

14. Process according to claim 1, wherein the mercury compound is mercury sulphide.

15. Process according to claim 5, wherein the pH of the basic aqueous solution is at least 12.

16. Process according to claim 7, wherein the catalyst is brought into contact with the basic aqueous solution in quantities such that the ratio of the volume of the basic aqueous solution to the mass of the catalyst (L/S, in l/kg) is at least 5.

* * * * *